United States Patent
Mansell et al.

(10) Patent No.: US 11,712,851 B2
(45) Date of Patent: Aug. 1, 2023

(54) MATERIAL DISPENSING APPARATUS

(71) Applicant: Hewlett-Packard Development Company, L.P., Spring, TX (US)

(72) Inventors: Rhys Mansell, Sant Cugat del Valles (ES); Mohammad Jowkar, Sant Cugat del Valles (ES); Vicente Granados Asensio, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 349 days.

(21) Appl. No.: 17/049,589

(22) PCT Filed: Oct. 16, 2018

(86) PCT No.: PCT/US2018/056029
§ 371 (c)(1),
(2) Date: Oct. 22, 2020

(87) PCT Pub. No.: WO2020/081058
PCT Pub. Date: Apr. 23, 2020

(65) Prior Publication Data
US 2021/0245439 A1 Aug. 12, 2021

(51) Int. Cl.
*B29C 64/336* (2017.01)
*B29C 64/329* (2017.01)
(Continued)

(52) U.S. Cl.
CPC .......... *B29C 64/336* (2017.08); *B29C 64/165* (2017.08); *B29C 64/205* (2017.08);
(Continued)

(58) Field of Classification Search
CPC .................................................. B29C 64/336
See application file for complete search history.

(56) References Cited

U.S. PATENT DOCUMENTS

| 8,932,511 B2 | 1/2015 | Napadensky |
| 9,031,680 B2 | 5/2015 | Napadensky |

(Continued)

FOREIGN PATENT DOCUMENTS

| JP | 2015150804 A | 8/2015 |
| WO | WO-2016080993 A1 | 5/2016 |

(Continued)

*Primary Examiner* — Timothy Kennedy
(74) *Attorney, Agent, or Firm* — Shook, Hardy & Bacon L.L.P.

(57) ABSTRACT

In one example, a material dispensing apparatus comprises a plurality of material containers, wherein the plurality of material containers comprises a first set of material containers arranged to contain a first material and a second set of material containers arranged to contain a second, different, material, and each material container of the second set is located relative to a respective material container of the first set to form a pair of material containers. In use, the material dispensing apparatus is controllable to move across a build platform of an additive manufacturing system. Each of the plurality of material containers comprises an outlet mechanism that is independently controllable, relative to outlet mechanisms of others of the plurality of material containers, such that each pair of material containers selectively dispenses at least a portion of a respective amount of material onto a respective portion of the build platform as the material dispensing apparatus moves across the build platform, such that, collectively, the plurality of material containers forms a complete layer of material on the build platform as the material dispensing apparatus performs a single pass across the build platform.

10 Claims, 8 Drawing Sheets

(51) Int. Cl.
*B29C 64/165* (2017.01)
*B29C 64/205* (2017.01)
*B33Y 30/00* (2015.01)
*B33Y 40/00* (2020.01)

(52) U.S. Cl.
CPC ............ *B29C 64/329* (2017.08); *B33Y 30/00* (2014.12); *B33Y 40/00* (2014.12)

(56) References Cited

U.S. PATENT DOCUMENTS

| | | |
|---|---|---|
| 9,604,411 B2 | 3/2017 | Rogren |
| 2005/0059757 A1 | 3/2005 | Bredt et al. |
| 2016/0236410 A1* | 8/2016 | Ohnishi ................ B29C 64/112 |
| 2016/0282848 A1* | 9/2016 | Hellestam .............. B23K 26/70 |
| 2017/0021452 A1* | 1/2017 | Tanaka .................. B29C 64/153 |
| 2017/0072463 A1* | 3/2017 | Ng ........................... B29C 70/00 |
| 2017/0072644 A1 | 3/2017 | Ng et al. |
| 2017/0210064 A1 | 7/2017 | Aw et al. |
| 2018/0009164 A1* | 1/2018 | Honda .................. B29C 64/153 |
| 2018/0056582 A1* | 3/2018 | Matusik ................ B29C 64/393 |
| 2018/0133957 A1* | 5/2018 | Ramirez Muela .... B29C 64/165 |
| 2018/0154480 A1* | 6/2018 | Bai ........................ B33Y 50/02 |
| 2018/0169956 A1 | 6/2018 | Singov |
| 2018/0186069 A1* | 7/2018 | Oppenheimer ........ B33Y 70/00 |
| 2018/0200956 A1 | 7/2018 | Grach et al. |

FOREIGN PATENT DOCUMENTS

| | | |
|---|---|---|
| WO | WO-2017095416 A1 | 6/2017 |
| WO | WO-2018055521 A1 | 3/2018 |

* cited by examiner

MATERIAL DISPENSING APPARATUS

BACKGROUND

Certain printing systems make use of a powdered or particulate build material during a printing process. For example, an additive manufacturing system, such as a three-dimensional (3D) printing system, may use an apparatus to convey build material onto a build platform. The powdered build material may be used by the system to form a three-dimensional printed part on the build platform, such as by fusing particles of build material in layers, whereby the printed part is generated on a layer-by-layer basis.

BRIEF DESCRIPTION OF THE DRAWINGS

Various features of the present disclosure will be apparent from the detailed description which follows, taken in conjunction with the accompanying drawings, which together illustrate features of the present disclosure, and wherein.

DETAILED DESCRIPTION

Figure 1:
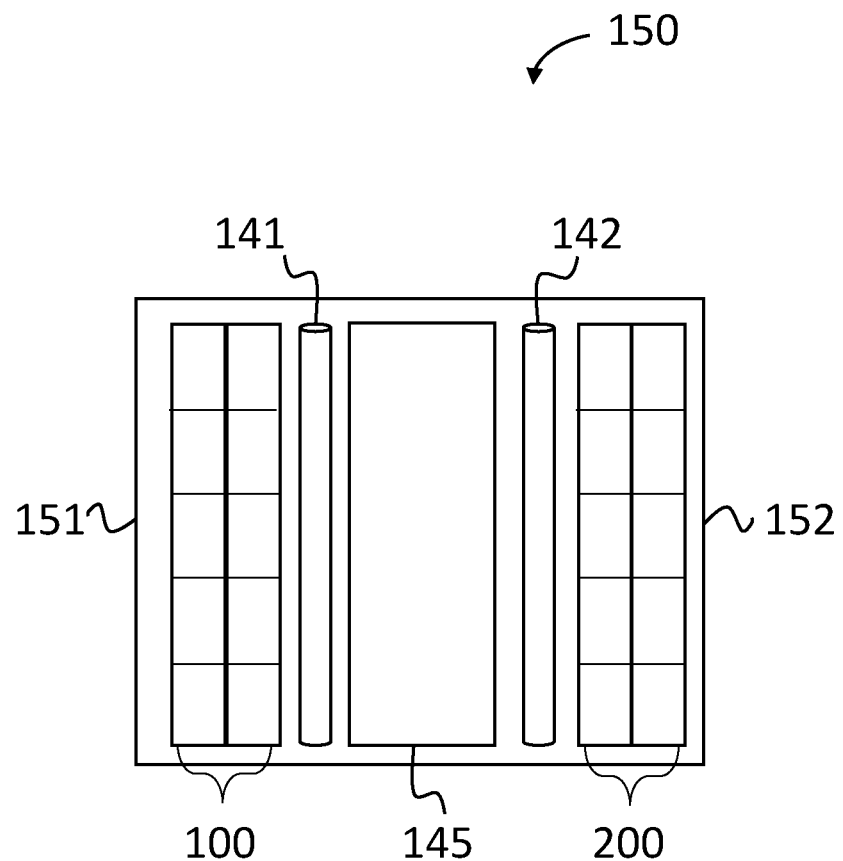
FIG. 1 is a schematic plan view of a material dispensing apparatus of a three-dimensional printing system, according to an example.

Three-dimensional printed parts can be generated using additive manufacturing techniques. The printed parts may be generated by solidifying portions of successive layers of build material. The build material can be powder-based, and the material properties of generated printed parts may be dependent on the type of build material and the nature of the solidification process. In some examples, solidification of the powder material is enabled using a liquid fusing agent. In other examples, solidification may be enabled by temporary application of energy to the build material. In certain examples, fuse and/or bind agents are applied to build material, wherein a fuse agent is a material that, when a suitable amount of energy is applied to a combination of build material and fuse agent, causes the build material to fuse and then to solidify upon cooling. In other examples, other build materials and other methods of solidification may be used. In certain examples, the build material includes paste material, slurry material or liquid material.

Examples of build materials for additive manufacturing include polymers, crystalline plastics, semi-crystalline plastics, polyethylene (PE), polylactic acid (PLA), acrylonitrile butadiene styrene (ABS), amorphous plastics, Polyvinyl Alcohol Plastic (PVA), Polyamide (e.g., nylon), thermo (setting) plastics, resins, transparent powders, colored powders, metal powder, ceramics powder such as for example glass particles, and/or a combination of at least two of these or other materials wherein such combination may include different particles each of different materials or different materials in a single compound particle. Examples of blended build materials include alumide, which may include a blend of aluminum and polyamide, and plastics/ceramics blends. There exist more build materials and blends of build materials that can be managed by an apparatus of this disclosure and that are not mentioned in this disclosure.

In some example 3D printing systems a complete layer of build material is formed over a build platform and a liquid fusing or binding agent is applied to selected portions of that layer from a printhead, so that the selected portions, and no other portions of the layer, are solidified after heating to form each layer of the object or printed part being generated. The result is a build platform or a build container that contains layers of solidified build material and a volume of non-solidified build material. The inventors realized that the solidified build material should have different properties from the non-solidified build material. Upon making this realization, the inventors developed the herein described apparatus and 3D printing system to enable two materials to be used during object generation (printed part production). Indeed, in such a system the build material can be chosen to give the final object appropriate properties. Likewise, the non-build material or support material can be chosen to have appropriate properties. As an example, in the case of a metallic material, an appropriate property for the material that forms the final printed part may be that the material releases solvents easily, whereas an appropriate property for the material that surrounds and supports the final printed part may be that the material absorbs solvents. When using a single build material, the non-solidified build material surrounding the printed object tends to absorb solvents released from binding agents used to bind together portions of the build material to form each layer of the object leading to non-solidified build material particles, particularly in regions in close proximity to the printed object, sticking together, making it difficult to separate, or 'decake' or 'depowder', the printed object from build material that was not intended to be solidified. Furthermore, the absorption of solvents by non-solidified build material may make recycling of the build material more challenging.

Furthermore, when using metal build materials and chemical binders, the printed objects, typically known as green parts, are not fused metal objects at this stage and the metal particles are held together just by a binder agent (e.g. after the binder agent has been cured). Green parts have to be sintered in a sintering furnace to transform them into high density and sintered metal objects. Green parts may, therefore, be somewhat fragile, which further complicates the decaking process, since decaking has to remove build material that does not form part of the green part, whilst at the same time without damaging the fragile green part. Simplifying the decaking process may lead to improved throughput and cheaper 3D printing of metal objects.

Examples described herein provide an efficient way of dispensing a build material and a filler material onto a build platform to improve aspects of 3D object generation. As an example, the material used as a filler or support material may be optimized in at least one of the following ways:

for increased absorption and retention of solvents during a curing stage of the 3D printing process to reduce the curing time;

for absorption of heat in a solidification process to improve part quality and/or cooling time in an example where the filler material and/or the build material is a plastic material;

for improved unpacking that reduces the risk of damage to the printed part and is quicker to complete, and to make automated unpacking more achievable;

to be used to form snap-away features that can snap away in an unpacking process to remove the green part from the surrounding material, in one example the snap-away features may snap away from the green part during or after a sintering process; and to be a low-cost material, for example a polymer or a ceramic.

FIG. 1 is a schematic plan view of an example material dispensing apparatus 150 of a 3D printing system. In use, the material dispensing apparatus 150 moves across a build platform of the 3D printing system in alternate, opposite directions to deposit build material on a layer-by-layer basis, where a new layer is formed on the build platform each time the apparatus 150 moves across the build platform.

The material dispensing apparatus 150 moves in a first direction that causes edge 151 to be a leading edge and moves in a second, opposite, direction that causes edge 152 to be a leading edge.

The material dispensing apparatus 150 has a first plurality of material containers 100 and a second plurality of material containers 200. The first plurality of material containers 100 is adjacent edge 151 and the second plurality of material containers is adjacent edge 152. Each plurality of containers 100, 200 is arranged to extend across the width of the apparatus 150 in a direction perpendicular to the direction of movement of the apparatus 150 in order to cover the full width of a build platform of a 3D printing system.

Figure 2A:
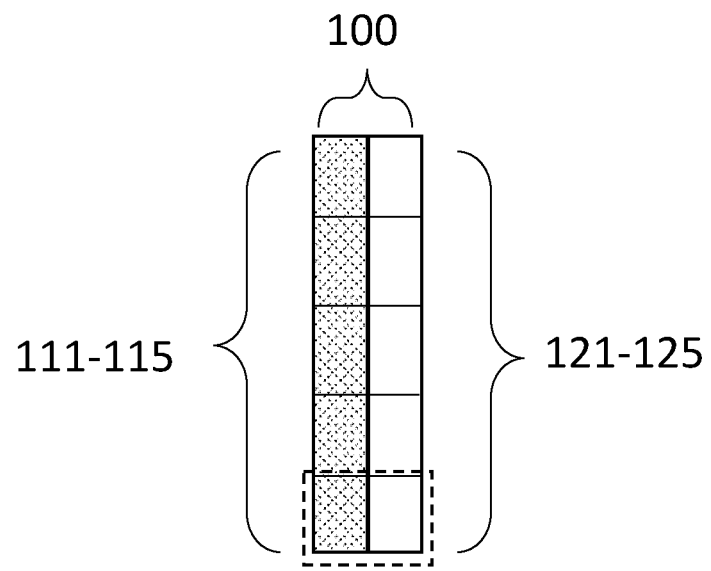
FIGS. 2a and 2b are schematic plan views of a portion of a material dispensing apparatus, according to different examples.
Figure 2B:
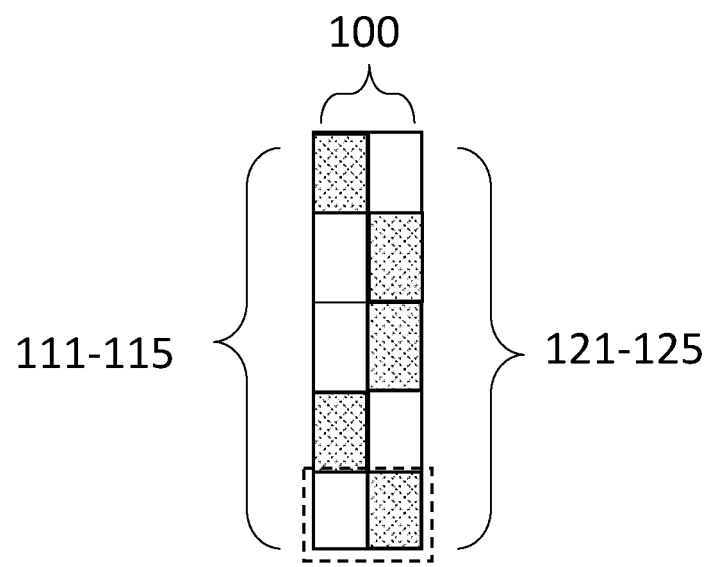

In the example of FIG. 1, the material containers of each plurality of material containers 100, 200 are arranged in two uniform, adjacent rows, explained in more detail in relation to FIGS. 2a and 2b. Whilst each plurality of containers 100, 200 of FIG. 1 has ten material containers in two rows of five, in other examples, the number of material containers may vary, depending on the desired balance between printing efficiency and precision.

Each material container of the first plurality of containers 100 is a discrete volume arranged to contain an amount of material to be deposited on a build platform of 3D printing system as the apparatus 150 moves across said platform in the first direction (with edge 151 as the leading edge). Similarly, each material container of the second plurality of containers 200 is a discrete volume arranged to contain an amount of material to be deposited on a build platform of 3D printing system as the apparatus 150 moves across said platform in the second direction (with edge 152 as the leading edge).

The material containers 100, 200 may be re-filled with material before each pass of the material dispensing apparatus 150 over the build platform. In other example, the material containers 100, 200 may be re-filled when the amount of contained material drops below a threshold level.

The apparatus 150 also has a first recoater 141 and a second recoater 142, each adjacent a respective plurality of material containers 100, 200. The arrangement of the first and second recoaters 141, 142 and the respective pluralities of material containers 100, 200 is such that, in use, the respective recoater 141, 142 levels out and compacts the material deposited onto the build platform into a layer of uniform height across the platform. In other words, each recoater 141, 142 is positioned behind the respective plurality of containers 100, 200 relative to the respective direction of motion of the material dispensing apparatus 150.

In another example, a single set of material containers and a single recoater may be used, where spreading would only be performed in a single direction. In other examples, each of the recoater, material container and printhead could be located on a separate apparatus or carriage, either moving along the same axis or along an orthogonal axis. In a further example, there may be two sets of a recoater, material container and printhead, each set located on a separate apparatus or carriage, either moving along the same axis or along an orthogonal axis in relation to the other set.

One of the two pluralities of material containers 100, 200 is active (and thus capable of depositing material) in a pass of the material dispensing apparatus 150 over a build platform. Which of the plurality is active is dependent on the direction of travel of the dispensing apparatus 150. More specifically, the active plurality is the plurality that is adjacent the respective leading edge and thus has a respective recoater 141, 142 positioned behind the plurality so that deposited material can be levelled and compacted into a layer on the build platform.

In the example of FIG. 1, the first and second recoaters 141, 142 are rollers. However, in another example, one or both of the recoaters 141, 142 may be a blade.

The material dispensing apparatus 150 also has at least one printhead 145 adjacent between the first recoater 141 and the second recoater 142. The arrangement of the printhead 145 and the recoaters 141, 142 is such that, in use, the printhead 145 deposits a printing liquid, such as a binding agent, a fusing agent, or ink-type formulation, onto the levelled and compacted material on the build platform.

In another example, the printhead 145 may comprise a plurality of printheads.

FIG. 2a is a schematic plan view of a portion of the material dispensing apparatus 150 of FIG. 1. In more detail, FIG. 2a depicts the first plurality of material containers 100 of the material dispensing apparatus 150. The plurality of material containers 100 has a first set 111-115 and a second set 121-125. Each container of the first set 111-115 is arranged to contain a first material (depicted by the respective shaded regions) and each container of the second set 121-125 is arranged to contain a second, different, material. The first material may be a material to form a final printed part, so-called a build material, and the second material may be a material to use as a filler material to support the printed part, or vice versa. The first and second materials have properties appropriate to their corresponding function. As an example, the first material may be a metallic material to form the printed part and the second material may be a non-metallic material to act as a filler material.

In one example, each of first and second material may be chosen so that the spreadbility of, that is, how easy it is to spread, the two materials is closely matched so that the recoater or other spreading mechanism is able to create a uniformly levelled and compacted layer formed of both materials on the build platform.

Each material container of the second set 121-125 is arranged relative to a material container of the first set 111-115, such that there is a one-to-one relationship between the respective containers to form pairs of material containers. One container of the pair contains part-appropriate or specific material and the other contains filler-appropriate or specific material. An example pair of containers 115, 125 is outlined by a dashed box in FIG. 2a.

In another example, the material containers of a pair of containers may be separated from one another by a gap.

FIG. 2b depicts a slight variation to the location of the first and second materials compared to the example of FIG. 2a. In the example of FIG. 2b, at least one container of both the first and second sets of material containers 111-115, 121-125 contains the first material and at least one container contains the second material. However, in the same way as the example of FIG. 2a, each pair of material containers has one container containing the first material and one container containing the second material, as in the pair 115, 125 outlined by a dashed box.

Figure 3:
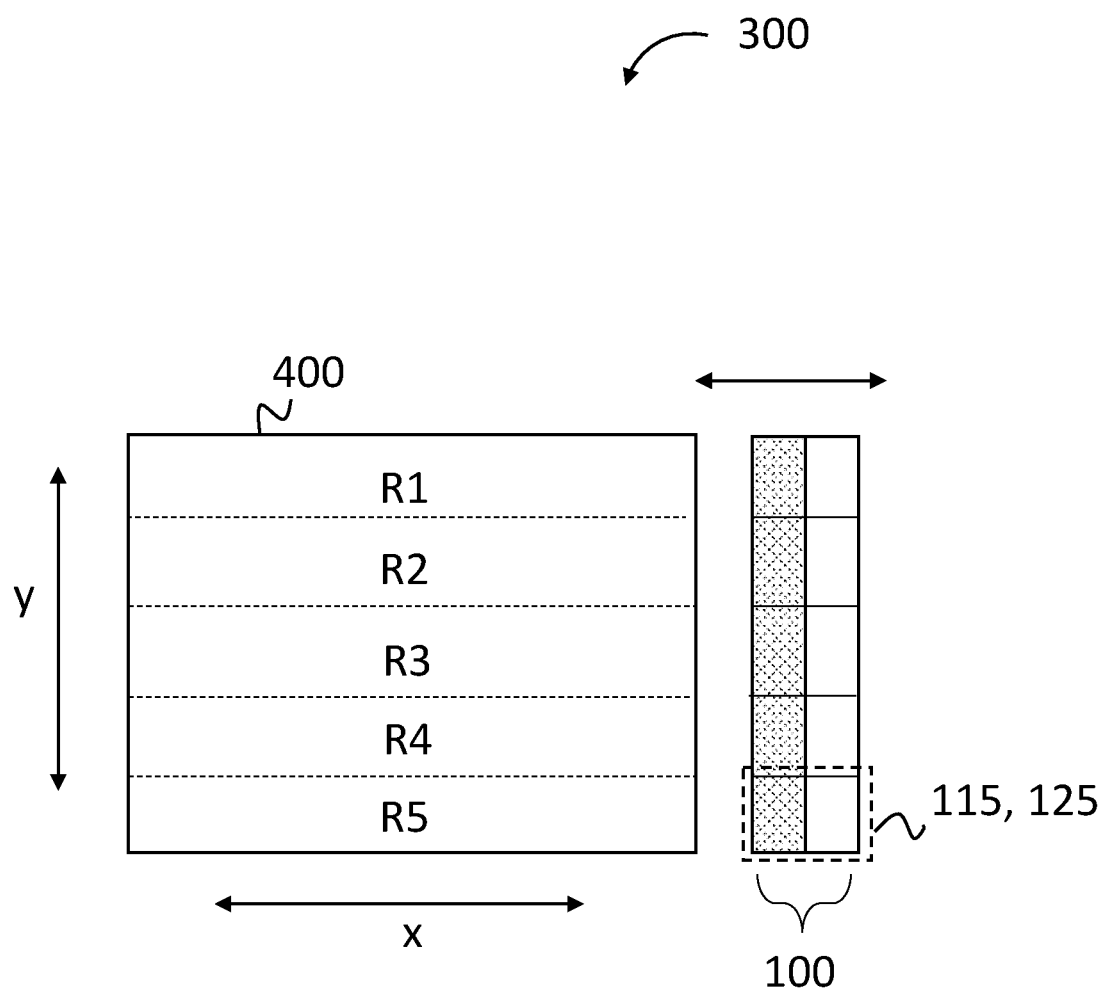
FIG. 3 is a schematic illustration of a portion of a three-dimensional printing system, according to an example.

FIG. 3 is a schematic illustration of a portion of an example 3D printing system 300. In use, the first plurality of materials containers 100 will traverse a build platform, such as build platform 400, as the material dispensing apparatus 150 (shown partially) moves across the build platform 400.

Each pair of containers, for example, pair 115, 125, is arranged such that both material containers of the pair pass over the same region, such as region R5, that extends along the x axis of the build platform 400.

Figure 4:
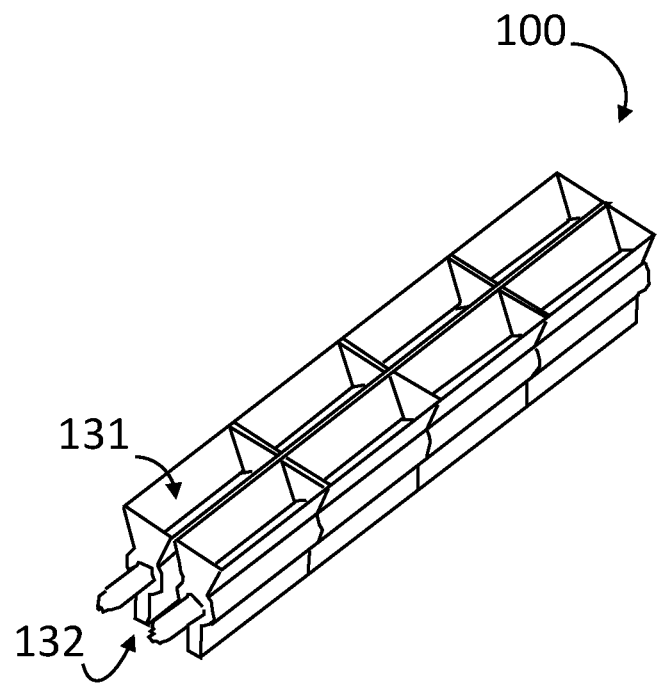
FIG. 4 is a schematic perspective view of a portion of a material dispensing apparatus, according to an example.

FIG. 4 is a schematic perspective view of the plurality of material containers 100, according to another example. The plurality of material containers 100 in FIG. 4 has eight material containers in two sets of four, in a slight variation to those of FIGS. 1-3. The description of the material containers in relation to FIGS. 1-3 is also applicable to those of FIG. 4, and vice versa. Each material container of the plurality of material containers 100 has a holding volume 131 arranged to hold a discrete quantity of material. The holding volume 131 of each container is funnel-shaped. Each material container also has an outlet 132 through which the respective material is dispensed onto said build platform from the respective holding volume 131. Each outlet has a corresponding outlet mechanism (FIGS. 6-8) positioned within the outlet to control the flow of material through the outlet. In some examples, the material container may have at least one of the following mechanisms either in place of or in addition to the aforementioned outlet mechanism to deposit material: a moving sieve system; a screw feeder; a depositing slot; a pouring nozzle; a blown powder mechanism. In one example, a material container may have a screw feeder in combination with a pouring nozzle.

Figure 5:
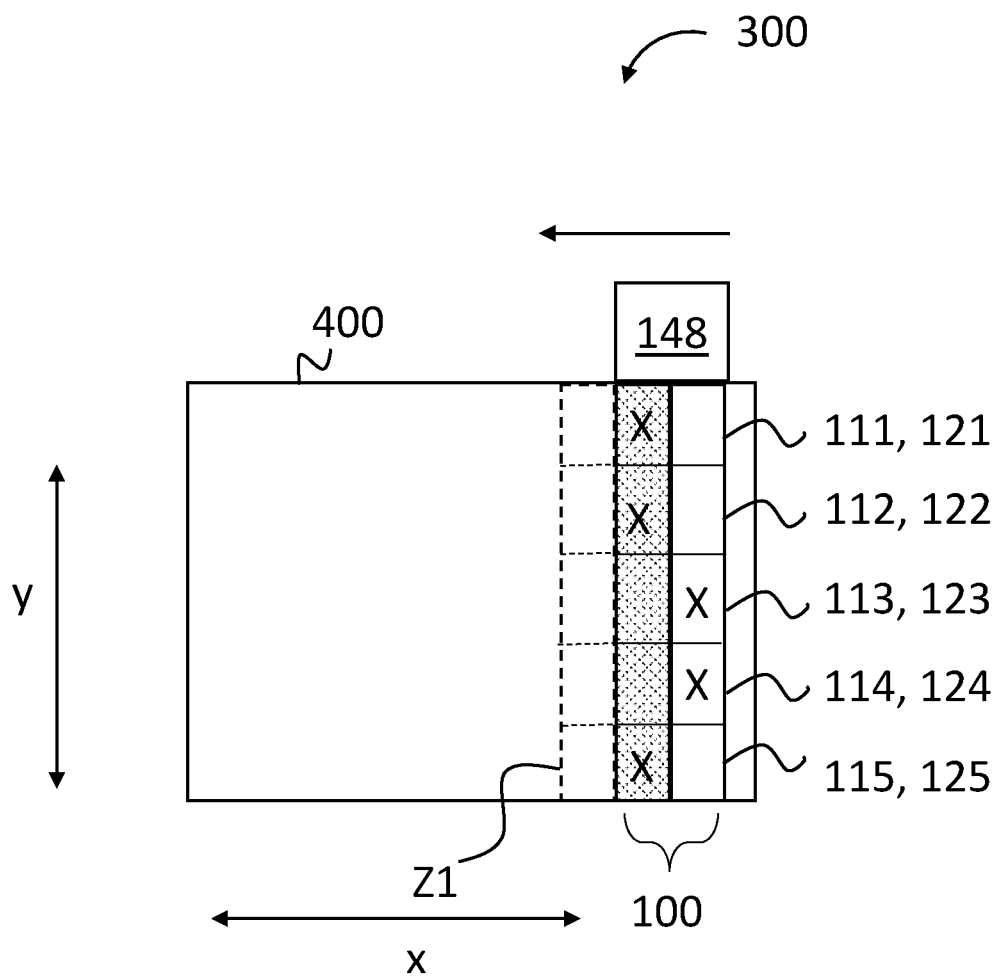
FIG. 5 is a schematic illustration of a portion of three-dimensional printing system, according to an example.

FIG. 5 is a schematic illustration of a portion of the example 3D printing system 300, according to an example. Each material container of the plurality of material containers has an outlet with an outlet mechanism such as the one 132 shown in FIG. 4. The outlet mechanism of each container is independently controllable by a controller, such as controller 148, relative to outlet mechanisms of others of the plurality of material containers, such that each pair (111, 121; 112, 122; 113, 123; 114, 124; 115, 125) selectively dispenses at least a portion of a respective amount of material onto a respective portion of the build platform as the material dispensing apparatus 150, and thus the plurality of material containers 100, moves across the build platform 400. In this way, collectively, the plurality of material containers 100 forms a complete layer of material on the build platform 400 in a single pass of the material dispensing apparatus 150.

In more detail, the controller 148 may be part of the material dispensing apparatus 150 (FIG. 1). The controller 148 controls the deposition of material onto the build platform 400 by the outlet mechanisms of the respective material containers 100. The deposition of material is controlled based on the position of the material dispensing apparatus 150 over the build platform 400. Specifically, the controller 148 effects opening and closing of each respective outlet mechanism. In one example, the controller 148 causes a change of state (either from open to closed or closed to open) of each outlet mechanism based on the position of the apparatus 150 over the build platform 400, such that the outlet mechanisms open and close at the correct times and consequently, the correct material is deposited onto an appropriate zone or position of the build platform 400. In one example, the controller 148 exerts control over each of the outlet mechanisms based on a signal, or data represented by a signal, received by the controller 148 from an overall control unit, for example, a print engine (not shown).

Due to movement (indicated by the arrow) across the build platform 400, the plurality of material containers 100 moves across zone Z1 of the build platform. The "X" present in one of the containers of the pair indicates that the corresponding outlet mechanism will be open to dispense material into the corresponding region of zone Z1, which is a row in the y direction of the platform 400. The other outlet mechanism of the pair will be closed and therefore will not dispense material. Accordingly, each pair of material containers will either deposit the first material (indicated by the shaded regions) or the second material into the zone Z1 in their respective regions. In the example of FIG. 5, material containers 111, 112, and 115 will deposit build material and material containers 123 and 124 will deposit support material. The combination of open and closed outlet mechanism across the pairs (111, 121; 112, 122; 113, 123; 114, 124; 115, 125) with respect to zone Z1 causes the entirety of the zone Z1 to be covered with a material as the dispensing apparatus 150 (FIG. 1) moves across platform 400 in the x direction. As such, a layer of material is formed on the platform 400 on a row-by-row basis with material type controlled relative to the y axis of the platform 400.

In one example, the speed at which the apparatus 150 moves across the build platform 400 may be limited based on the speed at which material exits each of the material containers and/or the speed at which the respective outlet mechanisms switch between open and closed states.

After each layer of material is formed on the build platform 400 and a printing liquid has been applied by the printhead 145 (FIG. 1) to selected portions, a selective solidification process is carried out, whereby an energy source (not shown) applies energy to the layer of material causing solidification of the selected portions. The energy source may be located with the printhead 145 on the apparatus 150, alternatively, the energy source may be located on a separate carriage or may be an overhead energy source above the build platform. In one example, where the printhead 145 deposits an energy absorbing fusing agent on the layer of material, the energy source applies a fusing energy. In another example, where the printhead 145 deposits a binding agent, the energy source applies a curing energy, for example, heat or Ultra-Violet energy, depending on the type of binding agent.

After the printing and solidification of the material layers is completed and the printed object or part is formed, the printed object is removed from the support material by a decaking or unpacking process. After this, any residual build material that was not solidified and the support material are recycled for re-use. Before recycling, the materials are separated. In one example, where the build material and the support material have different particle sizes the materials may be separated by a sieving process. Other separation methods maybe used dependent on the properties of the materials.

Figure 6:
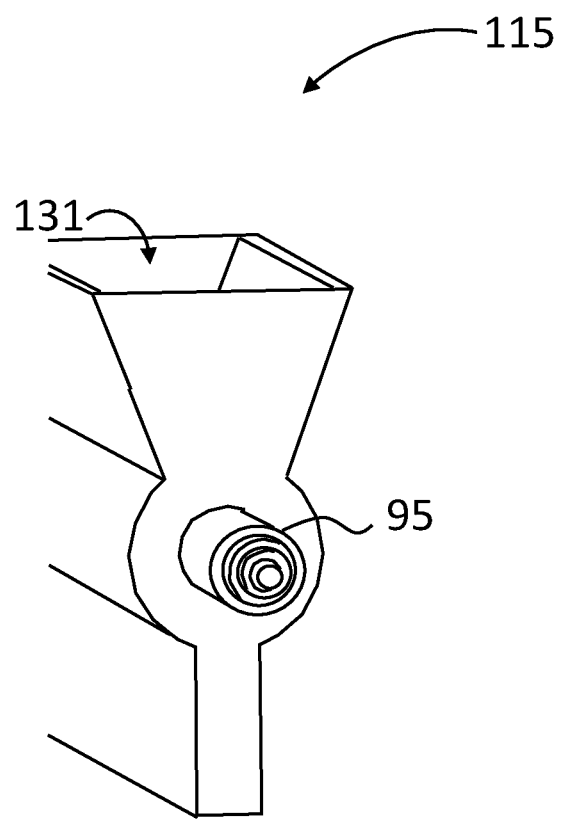
FIG. 6 is a schematic perspective view of a material container of a material dispensing apparatus, according to an example.

FIG. 6 is schematic perspective view of a material container 115 of the material dispensing apparatus 150. The material container 115 has an outlet mechanism 95, shown in exterior. The outlet mechanism 95 is the outermost outlet mechanism of an arrangement of concentric outlet mechanisms, whereby each mechanism within the arrangement is associated with a different material container.

Figure 7A:
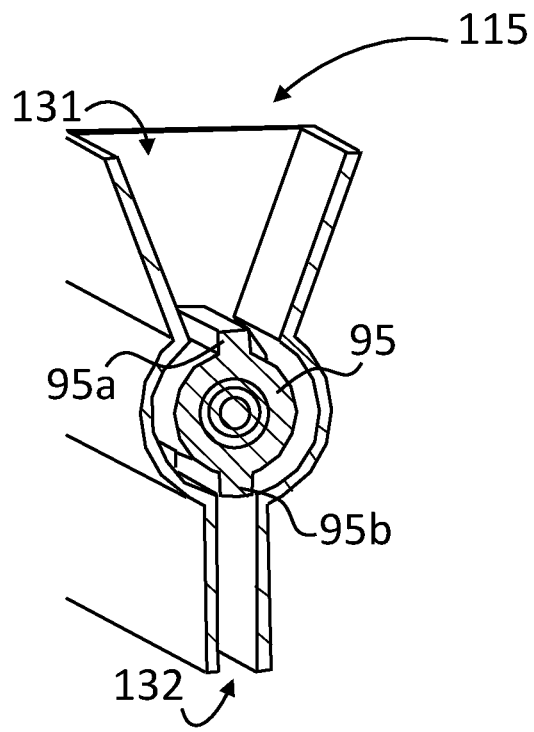
FIGS. 7a and 7b are schematic cross sections of the material container of FIG. 6.
Figure 7B:
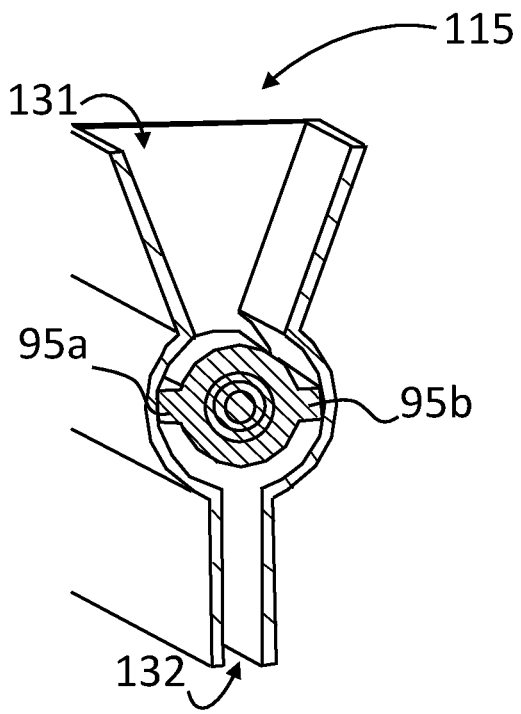

FIGS. 7a and 7b are schematic cross sections of the material container 115 of FIG. 6 and give further detail to the example illustration of FIG. 5. The outlet mechanism 95 is a butterfly valve with first and second wings 95a, 95b. The outlet mechanism 95 is controllable, by a controller, such as the controller 148 of FIG. 5, to rotate within the material container 115 between a first state and a second state. In the first state the outlet mechanism allows material to be dispensed from the material container 115 onto a build platform, such as previously-described build platform 400, by providing a clear flow path from the holding volume 131 to the outlet 132, in such a state, the outlet mechanism can be considered open. In the second state the outlet mechanism 95 fully obstructs the flow path from the holding volume 131 to the outlet 132, in such a state, the outlet mechanism can be considered closed.

FIG. 7a depicts an example arrangement of the outlet mechanism 95 when the mechanism is open, where the wings 95a and 95b are disposed so as not to obstruct the flow path into the outlet 132.

FIG. 7b depicts an example arrangement of the outlet mechanism 95 when the mechanism 95 is closed, where wings 95a and 95b are rotated to abut the inner surface of the material container 115 and thereby impede the flow path of material into the outlet 132.

Although FIGS. 6, 7a, and 7b describe the outlet mechanism 95 of material container 115 the above-described features are also applicable to the other outlet mechanism of other material containers. In addition, whilst the outlet mechanism has been described as a butterfly valve, in other examples the outlet mechanism may be one of the following: a valve; a plug; a swing flap; an overlapping mesh or sieve; an ultrasonic vibration generator.

Figure 8:
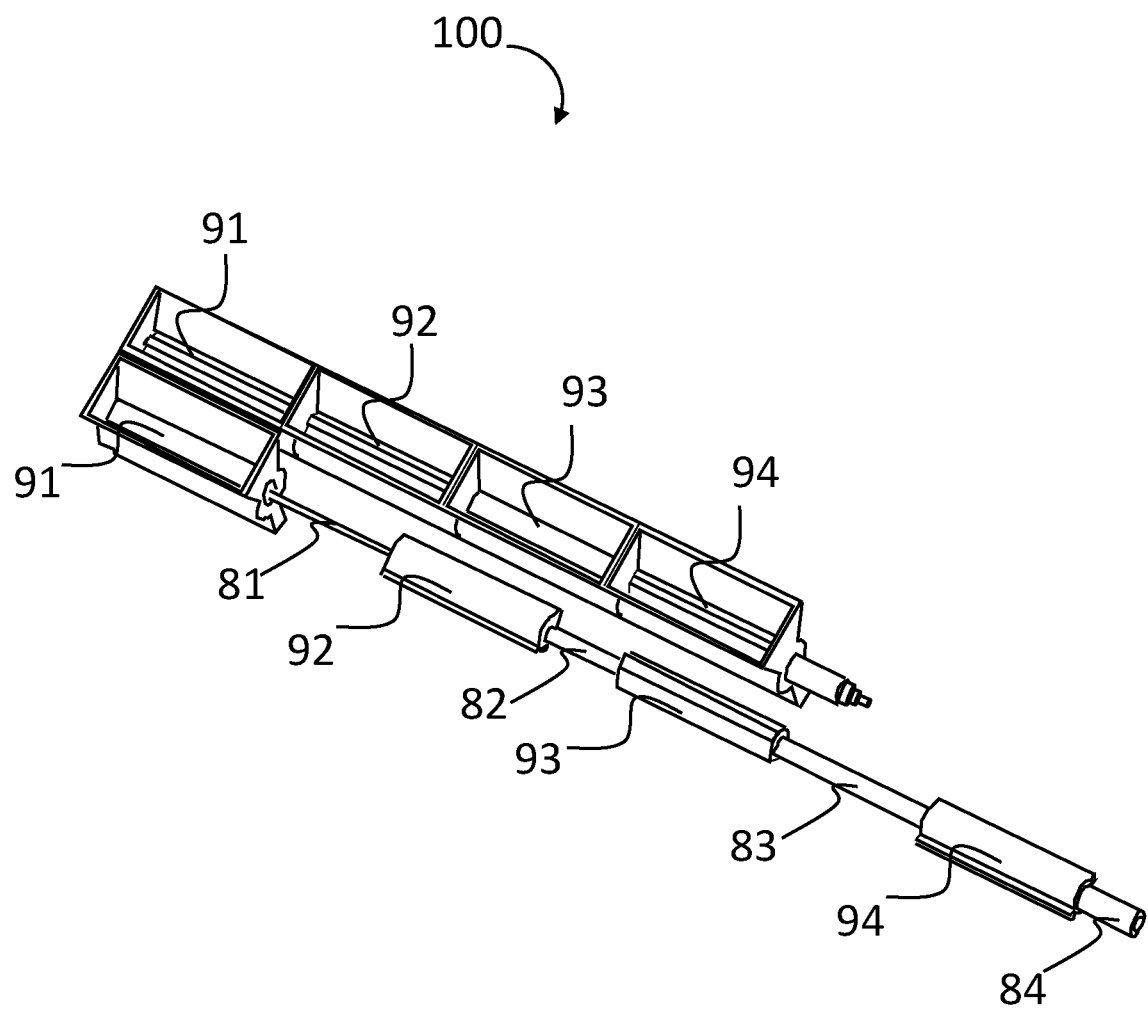
FIG. 8 is a schematic perspective view of a plurality of material containers of a material dispensing apparatus, according to an example.

FIG. 8 shows two schematic views of a single row of the plurality of material containers 100 of FIG. 4, according to an example.

The side-by-side views illustrate the concentric arrangement of the outlet mechanisms of each material container of the plurality of material containers 100.

In more detail, each material container has a corresponding outlet mechanism 91-94 concentrically arranged in relation to one another. Each of the outlet mechanisms 91-94 is a butterfly valve, as described in relation to FIGS. 7a and 7b.

Each outlet mechanism 91-94 has a corresponding shaft 81-85. Each shaft 81-85 extends out to one end of the plurality of material containers 100 to enable the control of the respective outlet mechanism. For example, by engagement of a motor with the respective shaft. Shaft 81 corresponds to outlet mechanism 91 and has the smallest diameter compared to that of the other shafts and is thus the innermost component of the concentric arrangement. Shaft 84 corresponds to outlet mechanism 94 and has the largest diameter compared to that of the other shafts and is thus the outermost component of the concentric arrangement.

In other examples, the outlet mechanisms may be arranged differently, for instance, the outlet mechanisms on one side of a midpoint of the plurality of mechanisms may be arranged concentrically with one another, such that two concentric arrangements are formed at each end of a row of plurality of material containers.

The preceding description has been presented to illustrate and describe examples of the principles described. This description is not intended to be exhaustive or to limit these principles to any precise form disclosed. Many modifications and variations are possible in light of the above teaching. It is to be understood that any feature described in relation to any one example may be used alone, or in combination with other features described, and may also be used in combination with any features of any other of the examples, or any combination of any other of the examples.

What is claimed is:

1. A material dispensing apparatus, comprising:
a plurality of material containers that comprise a first set of material containers arranged to contain a first material and a second set of material containers arranged to contain a second different, material, wherein the plurality of material containers are arranged to form a plurality of pairs as an array, each pair having one material container of the second set located adjacent to one material container of the first set;
wherein the material dispensing apparatus is controllable to move across a build platform of an additive manufacturing system; and each of the plurality of material containers comprises an outlet mechanism that is independently controllable, relative to outlet mechanisms of others of the plurality of material containers, such that each pair selectively dispenses at least a portion of a respective amount of material onto a respective portion of the build platform as the material dispensing apparatus moves across the build platform, such that, collectively, the plurality of material containers forms a complete layer of material on the build platform as the material dispensing apparatus performs a single pass across the build platform.

2. The material dispensing apparatus of claim 1, wherein each outlet mechanism of the pair is controllable, relative to the other outlet mechanism of the pair, such that either the first material or the second material is dispensed from the pair onto a respective position on the build platform.

3. The material dispensing apparatus of claim 2, wherein each outlet mechanism is controllable to switch between a first state and a second state such that material is dispensed from a material container when the respective outlet mechanism is in the first state and material is not dispensed from said material container when the outlet mechanism is in the second state.

4. The material dispensing apparatus of claim 3, wherein a first outlet mechanism of the pair in the first state when a second outlet mechanism of the pair is in the second state.

5. The material dispensing apparatus of claim 4, wherein a first outlet mechanism of the pair is in the second state when a second outlet mechanism of the pair is in the first state.

6. The material dispensing apparatus of claim 1, wherein the first set of material containers is arranged in a first row extending in a direction perpendicular to the direction of movement of the material dispensing apparatus.

7. The material dispensing apparatus of claim 6, wherein the second set of material containers is arranged in a second row extending in a direction perpendicular to the direction of movement of the material dispensing apparatus.

8. The material dispensing apparatus of claim 7, wherein the first row of material containers is adjacent the second row of material containers.

9. The material dispensing apparatus of claim 1, wherein the material dispensing apparatus comprises a recoater positioned behind the plurality of material deposits relative to the direction of movement of the material dispensing apparatus and arranged to level out material dispensed onto the build platform.

10. The material dispensing apparatus of claim 9, wherein the material dispensing apparatus comprises at least one print head positioned behind the recoater relative to the direction of movement of the material dispensing apparatus and controllable to deposit printing fluid onto the levelled material.

\* \* \* \* \*